3,050,335
VEHICLE BODY CONSTRUCTION
Theodor C. Schubach, Detroit, Mich., assignor to Fruehauf Trailer Company, Detroit, Mich., a corporation of Michigan
Filed Oct. 19, 1960, Ser. No. 63,658
3 Claims. (Cl. 296—137)

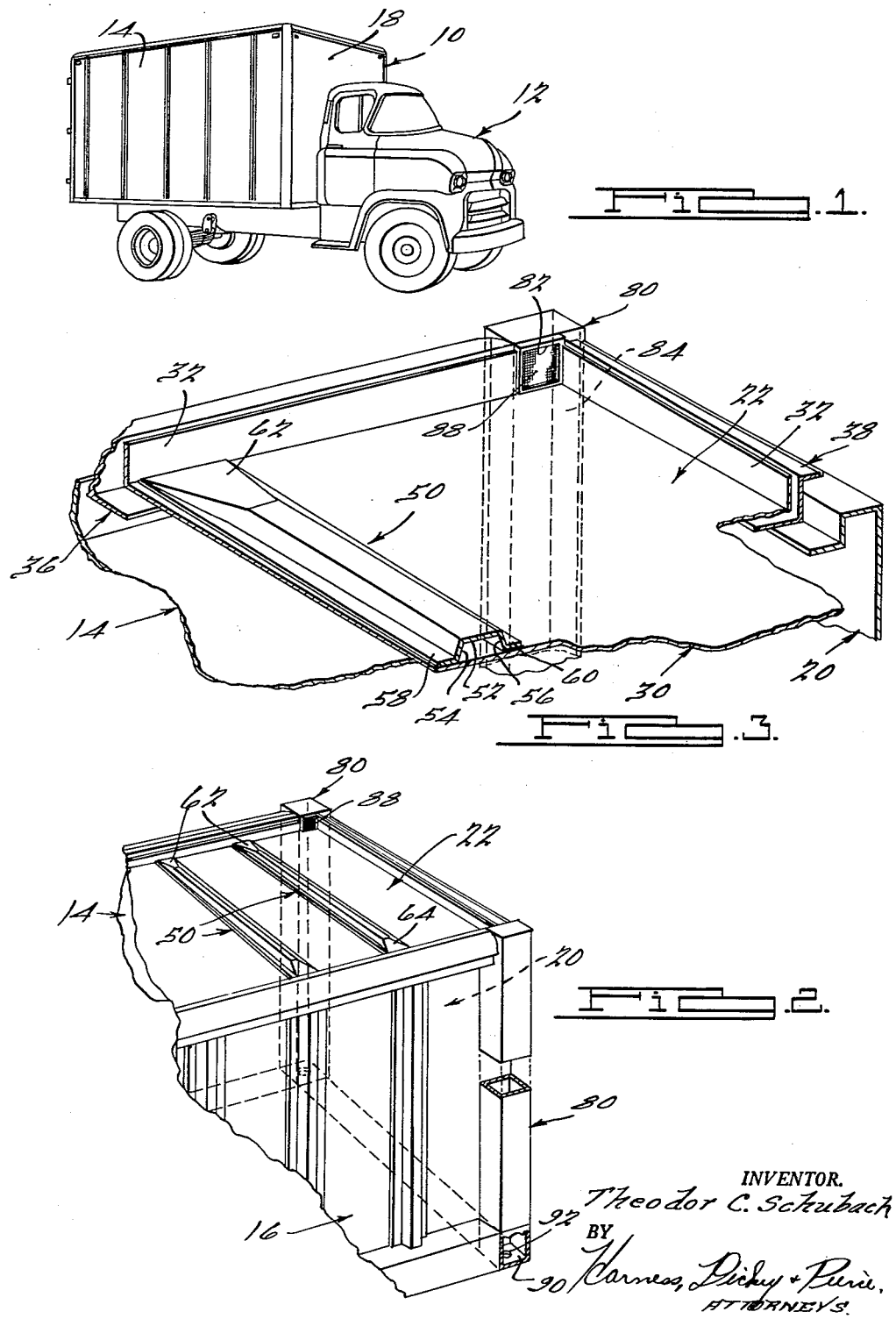

This invention relates generally to vehicle body constructions and more particularly to an improved roof and downspout construction for van-type truck and trailer bodies.

Water drainage off the roof and over the rear end of a van-type truck or trailer body presents a problem when such a vehicle is standing at a loading dock with the rear doors thereof open for loading and unloading. Such water drainage over the rear end of the van may wet both the men and the goods being carried into or out of the van. Various gutter arrangements have been heretofore suggested to prevent drainage of water off the roof and over the rear end of such vehicles, however, none of the known expedients have proved to be wholly satisfactory in field use.

Accordingly, one object of the present invention is an improved construction for van-type truck and trailer bodies that precludes water drainage over the rear end of the bodies.

Another object of the invention is a truck and trailer body construction wherein water drains to the sides of the van and downwardly through a structural member thereof.

Another object of the invention is a truck and trailer body construction wherein water is freely flowable longitudinally of the trailer body.

Still another object of the invention is a truck and trailer body construction of the aforementioned type that does not add appreciably to the manufacturing cost of the body.

Other objects and advantages of the present invention will be apparent in the following specification, claims and drawing wherein:

FIGURE 1 is a perspective view of a van-type truck having an improved construction in accordance with the present invention;

FIG. 2 is a fragmentary perspective view of the upper rear end portion of the portion of the truck of FIGURE 1; and FIG. 3 is a fragmentary perspective view similar to FIG. 2, enlarged for clarity.

Referring now to the drawing, a van-type body 10 is shown mounted on a conventional truck 12. The van 10 has vertically orientated side walls 14 and 16, a front wall 18, a rear wall 20, and a top wall 22, all of generally rectangular configuration. The rear wall 20 may include a pair of vertically hinged doors (not shown). The top wall 22 comprises a top panel or skin 30 having an upwardly folded peripheral edge flange 32 thereabout that is supported by, for example, complementary members 36 and 38 of, for example, Z-shaped vertical cross section on the upper edges of the side wall 14 and rear wall 20, respectively. The flange 32 defines what in effect is a water reservoir on top of the van 10.

The skin 30 of the top wall 22 is transversely reinforced between the longitudinally extending portions of the edge flange 32 thereof by a plurality of laterally extending channels 50, each of which is of inverted generally U-shaped configuration defined by a bight portion 52, downwardly extending leg portions 54 and 56, and generally horizontally extending terminal edge flanges 58 and 60.

In accordance with one feature of the present invention, the bight portions 52 of the lateral reinforcing channels 50 are flattened downwardly at opposite ends 62 and 64 thereof so as to present relatively little interference to the flow of water longitudinally of the van 10 along the longitudinal edge portions 32 on the skin 30 of the roof 22. Therefore, water is free to move longitudinally along the roof 22 of the van 10 along either side thereof, spillage being precluded by the upstanding edge flange 32. It is to be noted that the longitudinal portions of the edge flange 32 function as gutters to direct longitudinal water flow, the front and rear portions thereof in conjunction with the rib 50, directing lateral flow of the water.

In accordance with another feature of the present invention, each corner post 80, which is a structural component of the side and end walls 14, 16, 18 and 20 of the van 10, is of hollow box-like construction and has an aperture 82 at the upper end 84 thereof for the passage of water downwardly through the post 80. A screen 88 over each aperture 82 precludes the passage of foreign materials for example, leaves and sticks, into the interior of the post 80 which might in time clog the interior thereof. A lower end portion 90 of each post 80 has an aperture 92 therein for the passage of water downwardly and outwardly from the post 80.

From the foregoing description, it should be apparent that the provision for longitudinal flow of water along the roof of the van, in conjunction with the provision for passage of the water downwardly through the hollow corner posts of the van, precludes the accumulation of water within the recessed portions of the roof as well as providing for the conduction of water downwardly and away from the van 10.

It is to be understood that the specific construction of the improved vehicle body construction herein disclosed and described is presented for the purpose of explanation and illustration and is not intended to indicate limits of the invention, the scope of which is defined by the following claims.

What is claimed is:

1. A roof and downspout construction for a van-type vehicle body comprising a roof panel having an upwardly extending flange around the entire periphery thereof defining a water reservoir, said roof panel having a plurality of transversely extending exterior roof support members, to direct water toward the outboard longitudinal flanges of the trailer roof, said members having end portions of reduced height to facilitate water flowage longitudinally of the reservoir defined by said roof panel along the longitudinal flanges thereof, and a tubular member extending downwardly from said roof panel and having an aperture at the upper end thereof communicating with the reservoir therein adjacent a longitudinal flange thereof and an aperture at the lower end thereof for the discharge of water downwardly and outwardly of the reservoir.

2. A roof and downspout construction for a van-type vehicle body comprising an elongated rectangular roof panel supported by side and end panels including vertically extending tubular members, respectively, said roof panel having a plurality of transversely extending supporting ribs on the outer surface thereof for directing water laterally of the roof, opposite end portions of the supporting ribs being flattened to provide for longitudinal flow of water thereacross, said roof panel having an upwardly extending outer edge portion around the entire periphery thereof defining a water reservoir, said tubular members having an aperture at the upper end thereof communicating with the interior thereof and with the reservoir in said roof panel adjacent longitudinal portions of said flange and an aperture at the lower end thereof for the discharge of water downwardly and outwardly of the tubular member and the reservoir in said roof panel.

3. In a van-type vehicle body of the type having a rear doorway through which access is had to the body for loading and unloading the same, a roof, a supporting framework having upright tubular structural members at the rear corners of the body and at opposite side of said doorway, said structural members extending above said roof and having upper lateral inlet openings at substantially roof level and lower discharge openings below said doorway, and means forming an upstanding flange along the rear edge of the roof, said flange extending between said structural members and disposed behind said lateral openings whereby to prevent water from draining over the rear edge of the body and cascading over said doorway and to direct drainage water into said inlet openings for drainage through said structural members.

References Cited in the file of this patent

UNITED STATES PATENTS

| | | |
|---|---|---|
| 1,415,794 | Charbonneau | May 9, 1922 |
| 1,528,090 | Tracy | Mar. 3, 1925 |
| 2,746,789 | Ridgway | May 22, 1956 |
| 2,892,495 | Hadden | June 30, 1959 |
| 2,953,996 | Allen | Sept. 27, 1960 |